Sept. 22, 1953 L. E. WOOD 2,652,722
OUTDOOR INSTRUMENT SHELTER
Filed Nov. 13, 1952 5 Sheets-Sheet 5

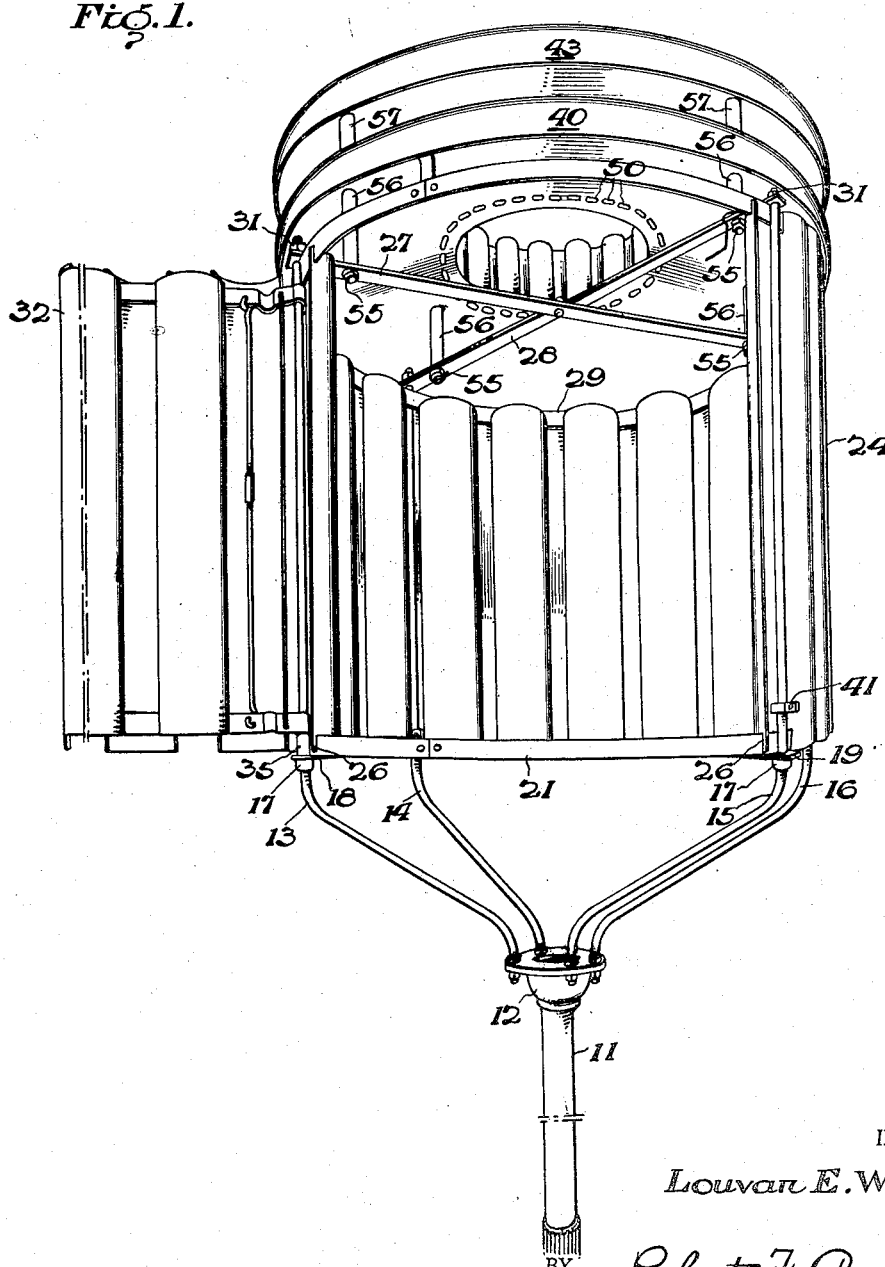

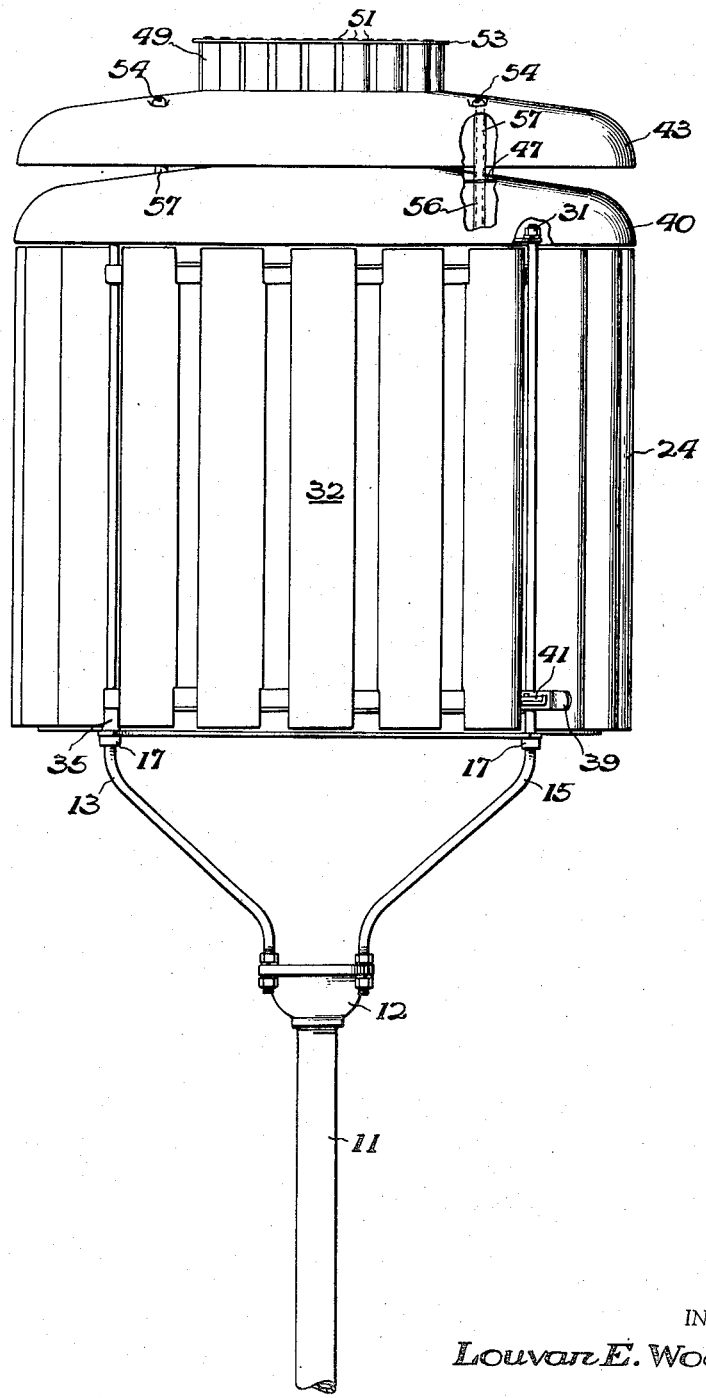

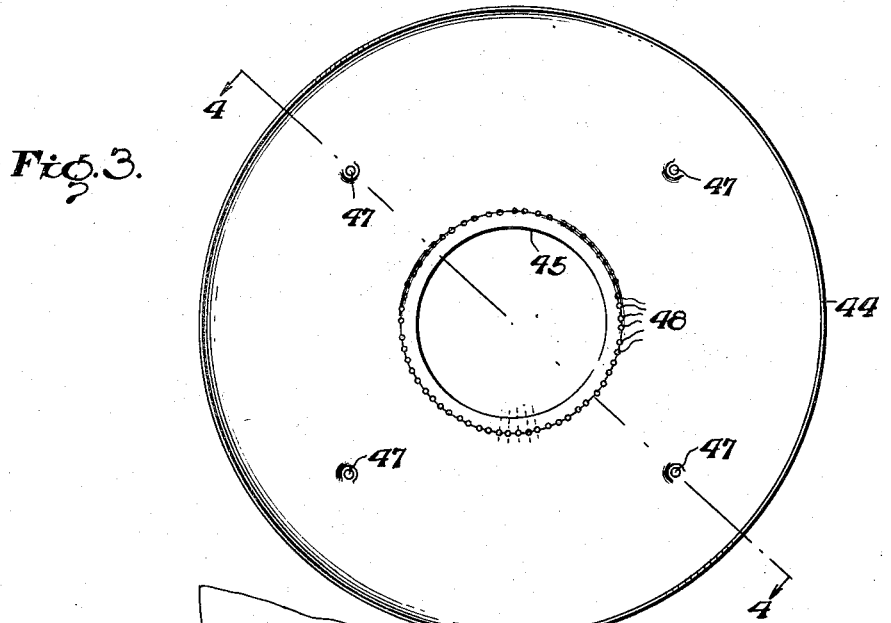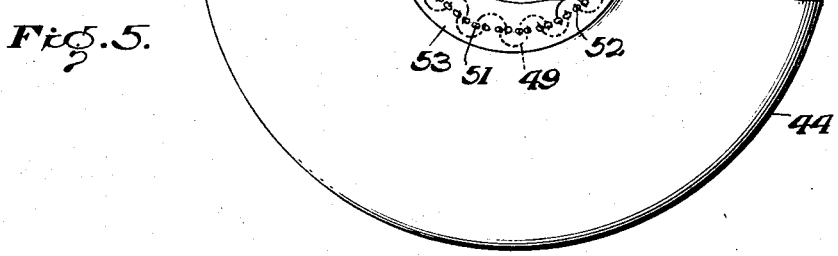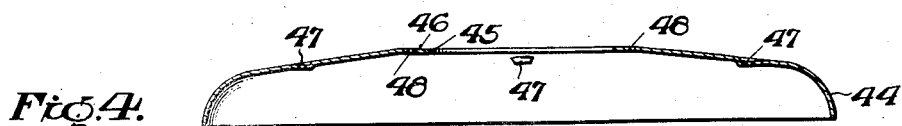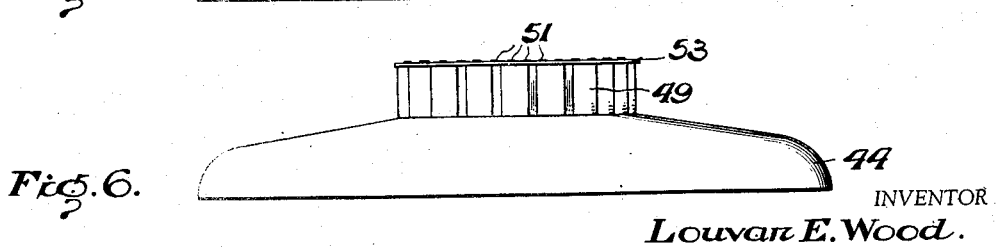

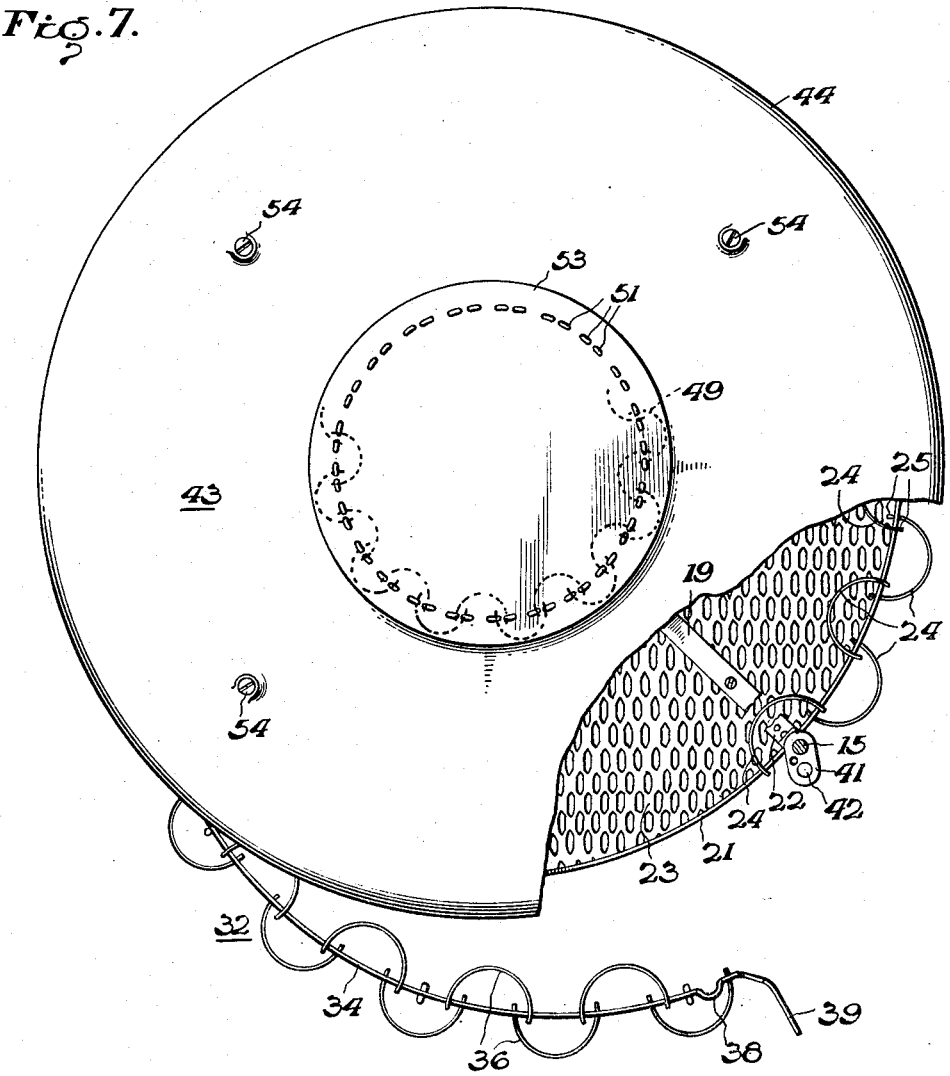

INVENTOR
Louvan E. Wood.

BY Robert F. Peck
ATTORNEY

Patented Sept. 22, 1953

2,652,722

UNITED STATES PATENT OFFICE 2,652,722

OUTDOOR INSTRUMENT SHELTER

Louvan E. Wood, Glenarm, Md., assignor to Bendix Aviation Corporation, Baltimore, Md., a corporation of Delaware Application November 13, 1952, Serial No. 320,321

11 Claims. (Cl. 73—170)

This invention relates to an improved outdoor protective shelter for meteorological instruments wherein an optimum setting has been established for accurate measurements of different ambient weather conditions. Additionally, durability and ruggedness have been achieved without sacrificing economy of manufacture or without complicating its usefulness.

In any shelter of the class described, there are three main conditions that have to be controlled for accurate measurements, and these conditions are, in their order of importance, solar radiation, ventilation, and rain. It is fundamental that the interior of the shelter must be substantially completely shielded from the effects of solar radiation if any reliance is to be had from the temperature measuring instruments located within the shelter. Moreover, without adequate ventilation, there will not be free flow of air within the shelter, which again would introduce errors in the temperature measuring instruments to the extent that true outside air temperatures would not be accurately sensed. Quite obviously, rain and snow must be excluded from the shelter interior to protect the delicate instruments therein. Now excluding solar radiation and rain or snow is complicated when provision must be made for adequate ventilation, particularly when the finished product must be inexpensive, rugged and durable.

It is therefore an object of this invention to provide an improved outdoor shelter for meteorological instruments wherein solar radiation is effectively prevented from affecting the operation of instruments located within the shelter, adequate ventilation is provided for proper circulation of air around said instruments, and rain and snow are effectively excluded from within said shelter.

It is a further object to construct the aforesaid improved shelter from rugged, durable metallic members and to provide a design which lends itself to low manufacturing costs, simplicity of use, and minimum maintenance costs.

The above objectives are fulfilled by the use of a novel side-wall construction embodying a plurality of channel members alternately underlying and overlying each other in overlapping relationship. The upper and lower extremities of these channel members are slotted to cooperate with a pair of spaced, slotted rings and suitable clamping means cooperate with the rings to maintain the entire assembly as an integral unit. The arrangement further permits the channel members to be substantially self-supporting, thereby simplifying the manufacturing and assembly problems. A unique double cover is provided to enclose the sidewall from the top and a suitable vented bottom is provided within the enclosure so formed, the entire assembly being suitably mounted on an external supporting pole or the like. An access door is provided in the side-wall, and this door is similar in construction to the remainder of the side-wall.

The above objects, advantages, and structural details of the subject invention will be readily understood upon reference to the detailed specification set forth below when taken in conjunction with the drawings annexed hereto, in which:

Figure 1 is a somewhat distorted perspective view of the improved instrument shelter, showing the access door open, copied from a photograph of same, and simulating a view that the eye would see if on a level with the lower ring looking up and into the shelter.

Figure 2 is a view in elevation showing the over-all appearance of the shelter with the access door closed.

Figure 3 is a top view of the top cover of the shelter with the smaller centrally located cap removed.

Figure 4 is a view taken along the lines 4—4 in Figure 3.

Figure 5 is a partial top view of the cover shown in Figure 3, but with the centrally located cap in place.

Figure 6 is a view in elevation of the arrangement partially shown in Figure 5.

Figure 7 is a top view of the shelter with a portion of the double cover cut-away, showing portions of the side-wall and bottom.

Figure 8:
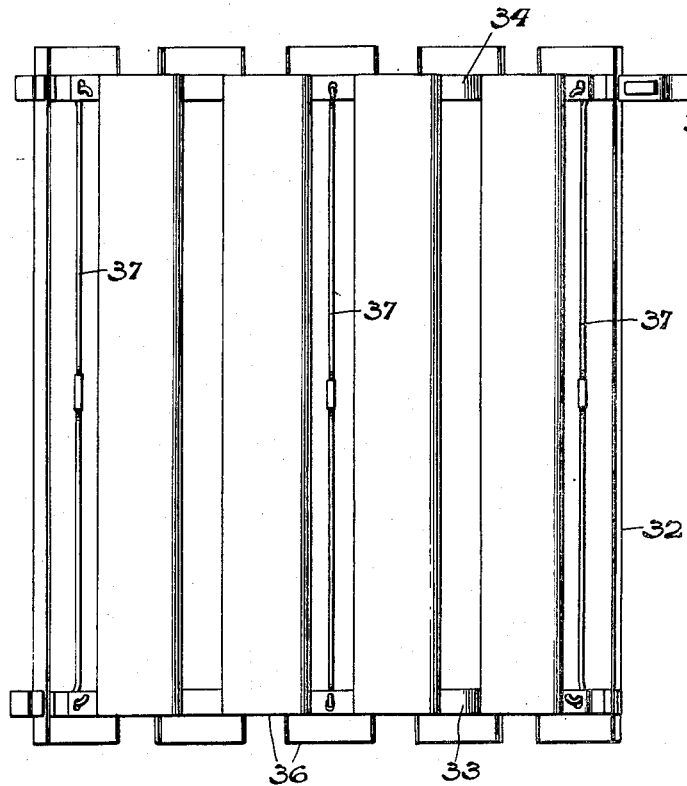
Figure 8 is an inside view, in elevation, of the access door, with the door shown up-side down.

Referring first to Figure 1, there is shown an over-all view of the improved shelter, which in this case is shown mounted on a vertical support 11 which in turn is adequately supported in the ground at the location selected for measuring ambient meteorological conditions.

Suitably affixed to the top of support 11 is a flanged collar 12 to which is rigidly secured the lower extremities of a plurality of vertical stringers 13, 14, 15 and 16. These lower extremities are bent inwardly to co-act with collar 12 and just above the bent portion there is rigidly mounted on each stringer identical collars 17. The vertical sections of the stringers are arranged in quadrature about the vertical axis of support 11 and a pair of metal straps 18 and 19 rigidly secured together in crisscross formation, have their extremities apertured so as to drop on the stringers and rest on the flat surfaces of collars 17. A horizontal stringer in the form of ring member 21 is carried by the crisscross straps 18, 19 in such manner that its outer surface substantially abuts the vertical stringers. Suitable angle brackets are rigidly secured to the ring 21 and straps 18, 19 by means of rivets or the like, to rigidly assemble the parts joined. One of these brackets is shown in Figure 7, designated as member 22. Still referring to Figure 7, the ring and strap assembly has secured thereto a reticulated or foraminous member 23 which forms the bottom surface of the shelter.

The sidewall of the shelter comprises a plurality of substantially U-shaped channel members 24, arranged around the ring 21, 20 as to alternately underlie and overlie each other in overlapping relationship. This arrangement is best shown in Figure 7 wherein the outer members overlie the inner members and, conversely, the inner members underlie the outer members. All of the channel members are identical and their edges 25 are seen to overlap.

The ring member 21 and the bottom edges of members 24 are slotted so that a series of cross-lap joints is formed with the channel members extending vertically up from the ring. In Figure 1, the outward appearance of the slots is best shown at 26.

An upper ring and strap assembly is formed in a manner identical to that described for the lower assembly and comprises the crisscross straps 27, 28 and an upper horizontal stringer in the form of ring 29. The ring 29 and the upper edges of channel members 24 are complementarily slotted to form a series of cross-lap joints identical to the joints at the bottom ring 21.

The ends of straps 27, 28 are apertured to slide over the upper extremities of the vertical stringers. These upper extremities are threaded and cooperate with suitable nuts 31 and appropriate lock washers to rigidly clamp the rings 21, 29 to the channel member 24, thus forming the complete side-wall assembly.

Figure 9:
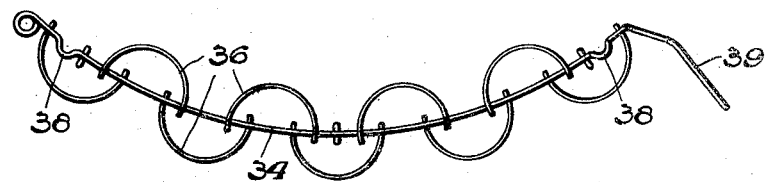
Figure 9 is a top view of the arrangement shown in Figure 8.

An access door 32 is provided in the shelter side-wall, extending between vertical stringers 13 and 15. Referring to Figures 8 and 9, it is seen that the door includes a pair of partial ring members 33, 34 which have corresponding ends bent around stringer 13 to form a hinge for the door, there being a suitable spacer bearing 35 supporting the lower partial ring 34. The sidewall of the door is identical to that of the main side-wall, there being a series of channel members 36, suitably slotted to cooperate with slots in the ring members 33, 34, the door assembly being clamped together by a plurality of turnbuckles 37.

To provide a proper fit for the door, and to preserve a substantially homogeneous side-wall through the door, the ring members 33, 34 have off-set section 38 near each end thereof to provide for clearance of the inner channel members of the main side wall adjacent the door. Furthermore, the inner channel members on the door itself are shorter than the balance of the side-wall channels to permit clearance for main side ring 21. A catch for the door is provided by forming one end of lower ring 34 into a slotted tongue 39 which cooperates with hasp 41 secured to vertical stringer 15. The hasp 41 is apertured at 42 to permit use of a padlock or the like to secure the door in place.

A unique double cover assembly 43 and 40 provides the top for the shelter and this arrangement is best shown in Figures 1–6 inclusive. The two covers are identical and a detailed description of one will suffice. Considering the upper cover 43, it is seen that it comprises a dish-shaped member 44 having down turned edges and a centrally located opening 45 surrounded by a flat section 46. A plurality of apertured bosses 47 is provided, for a purpose to be described later. Surrounding the opening 45 and in the outer region of the flat surface 46 is a plurality of apertures 48. These apertures receive the ears extending downwardly from the lower edges of a plurality of channel members 49, arranged in a side-wall in a manner identical to that for the main side wall. (These down-turned ears show in Figure 1 for the lower cover 40 as item 50.) The channel members 49 also have ears extending upwardly from their top edges, these ears being shown at 51 extending through a series of apertures 52 in the small circular cover plate 53 and bent down thereon.

The lower cover assembly is identical to that described above and the two covers are mounted on the shelter by means of a plurality of screws 54, passing through apertured bosses 47 and through suitable apertures in crisscross straps 27, 28. Nuts 55 and suitable lock-washers cooperate with the screws 54 to hold the covers in place, there being suitable spacers 56, 57 provided to space the lower cover from the straps and the upper cover from the lower cover respectively. It is to be noted that dish-shaped section 44 has a greater depth than the side-walls 49, leaving clearance between the cover plate 53 of the lower cover and the underside of dish section 44 of the upper cover.

All of the parts are given a light reflecting coating, such as a good grade of white enamel, which not only protects the metal but also reflects solar radiation.

In use, the measuring instruments are placed in the shelter and may rest on the bottom 23, or in the case of simple thermometers, may be suspended from the upper crisscross straps. The main side walls 24, the door side walls 32 and the cover side walls 49 permit excellent ventilation while excluding precipitation and solar radiation. The double cover enhances this effect, and the composite assembly provides a vastly improved shelter over prior devices.

Simple sheet metal fabrication is involved in manufacturing the shelter, and the many duplicate parts further simplifies the manufacturing operation. Field maintenance is of no consequence, the only requirement being an occasional coat of paint.

Furthermore the main side walls are substantially self-supporting by virtue of the cross-lap joints and the clamping action afforded by the retaining rings 21, 29.

Lastly, although a circular arrangement was selected for the composite assembly shown and described, it is to be understood that other geometrical shapes could be utilized in constructing the shelter, i. e., the shelter could be rectangular in shape, or otherwise. It is to be noted, however, that the circular shape presents the simplest geometry, in many respects, from the manufacturing standpoint. Furthermore, the annular arrangement provides the shelter with a uniform directional characteristic for exposure.

What is claimed and desired to be secured by United States Letters Patent is:

1. An outdoor meteorological instrument shelter, comprising, in combination: a plurality of vertically extending channel members alternately underlying and overlying each other in overlapping relationship, means for supporting said members whereby a side-wall is formed, a cover overlying the upper extremities of said channel members to form a housing therewith, and instrument supporting means within said housing.

2. An outdoor meteorological instrument shelter, comprising, in combination: a side wall comprising an annular arrangement of a plurality of vertically extending channel members alternately underlying and overlying each other in overlapping relationship, said members having their upper and lower edges slotted, a pair of slotted rings cooperating with said members to form a plurality of crosslap joints therewith, means for clamping together said rings and said members, a cover overlying said side wall to form a housing therewith, means for supporting said cover and said side wall, and instrument supporting means within said housing.

3. An outdoor meteorological instrument shelter, comprising, in combination: a side wall comprising an annular arrangement of a plurality of vertically extending channel members alternately underlying and overlying each other in overlapping relationship, a pair of rings, said rings and said channel members being complementarily slotted to form a series of crosslap joints therebetween, a plurality of vertical stringers, means affixed to said rings having apertures through which said stringers pass, means carried by said stringers for clamping together said rings and said channel members, a cover overlying said side wall and spaced therefrom to form a housing therewith, means for supporting said cover, means for supporting said stringers, and instrument supporting means within said housing.

4. An outdoor meteorological instrument shelter, comprising, in combination: an annular side wall comprising a plurality of vertically extending channel members alternately underlying and overlying each other in overlapping relationship, an upper and a lower ring cooperating respectively with the upper and lower extremities of said channel members, means for clamping together said rings and said channel members to form an integral assembly, a cover supported by said upper ring having down-turned edges overlying and spaced from the upper extremities of said channel members to form a housing therewith, means for supporting said side wall and instrument supporting means within said housing.

5. The combination defined in claim 4 wherein said cover has a centrally located opening, a second side wall is affixed to said cover surrounding said opening and extending vertically therefrom, said second side wall comprising a plurality of channel members alternately underlying and overlying each other in overlapping relationship, and a cover plate overlies and is affixed to the upper extremities of said second side wall.

6. The combination defined in claim 5 wherein a second cover is carried by said upper ring, said second cover overlying and being spaced from said first cover, said second cover having down-turned edges and a centrally located opening, a third side wall is affixed to said second cover surrounding said opening and extending vertically therefrom, said third side wall comprising a plurality of channel members alternately underlying and overlying each other in overlapping relationship and a second cover plate overlies and is affixed to the upper extremities of said third side wall, said second cover having a depth sufficient to permit clearance between said first cover plate and the underside of said second cover.

7. The combination defined in claim 6 wherein said main side wall is provided with an access door, said door extending the full length of said first side wall and being in the form of a fourth side wall having a plurality of channel members alternately underlying and overlying each other in overlapping relationship, the two outer channel members on said door cooperating with adjacent channel members of said main side wall to present a substantially continuous side wall when said door is in its closed position.

8. The combination defined in claim 7 wherein said instrument supporting means comprises a reticulated member affixed to said lower ring.

9. The combination defined by claim 8 wherein a plurality of vertical stringers are arranged at equi-distant points around said main side wall, a collar is affixed to each stringer for supporting said lower ring, means are affixed to the upper extremity of each stringer to clamp together said main side wall, and the lower extremities of said stringers are attached to a common support.

10. The combination defined in claim 9 wherein all of said parts are coated with a suitable light reflecting compound.

11. An outdoor instrument shelter, comprising, in combination: a side wall enclosure comprising a plurality of vertically extending channel members alternately underlying and overlying each other in overlapping relationship, an upper and a lower horizontal ring member cooperating respectively with the upper and lower extremities of said channel members, means for clamping together said ring members and said channel members to form an integral assembly, a cover having down-turned edges overlying and spaced from the upper extremities of said channel members to form a housing therewith, means for supporting said cover and said side wall, and instrument supporting means within said housing.

LOUVAN E. WOOD.

References Cited in the file of this patent

UNITED STATES PATENTS

| Number | Name | Date |
| --- | --- | --- |
| 248,183 | Klinkerfues | Oct. 11, 1881 |
| 2,194,113 | Covell | Mar. 9, 1940 |
| 2,295,669 | Laws | Sept. 15, 1942 |
| 2,354,466 | Levinsen | July 25, 1944 |
| 2,428,544 | Breidert | Oct. 7, 1947 |
| 2,518,820 | Rods | Aug. 15, 1950 |

OTHER REFERENCES

Bureau of Standards, volume 20, Research Paper RP 1102, June 1938, Figs. 16 and 18.